US006692545B2

(12) United States Patent
Gittleman et al.

(10) Patent No.: US 6,692,545 B2
(45) Date of Patent: Feb. 17, 2004

(54) COMBINED WATER GAS SHIFT REACTOR/CARBON DIOXIDE ADSORBER FOR USE IN A FUEL CELL SYSTEM

(75) Inventors: Craig S. Gittleman, Brighton, NY (US); Ramesh Gupta, Berkeley Heights, NJ (US)

(73) Assignee: General Motors Corporation, Detroit, MI (US)

( * ) Notice: Subject to any disclaimer, the term of this patent is extended or adjusted under 35 U.S.C. 154(b) by 242 days.

(21) Appl. No.: 09/780,079

(22) Filed: Feb. 9, 2001

(65) Prior Publication Data

US 2002/0110503 A1 Aug. 15, 2002

(51) Int. Cl.[7] .................................................. C10K 3/02
(52) U.S. Cl. .............................. 48/128; 48/62 R; 48/85; 48/127.9; 48/198.3; 422/190; 422/211; 429/17; 429/19; 429/20
(58) Field of Search .......................... 48/62 R, 85, 128, 48/197 R, 127.9, 198.3; 422/190, 211; 429/17, 19, 20

(56) References Cited

U.S. PATENT DOCUMENTS

| | | | |
|---|---|---|---|
| 3,564,816 A | | 2/1971 | Batta |
| 4,587,114 A | | 5/1986 | Hirai et al. |
| 4,696,682 A | | 9/1987 | Hirai et al. |
| 4,696,871 A | * | 9/1987 | Pinto .......................... 429/17 |
| 4,914,076 A | * | 4/1990 | Tsuji et al. .................. 502/407 |
| 4,917,711 A | | 4/1990 | Xie et al. |
| 5,332,492 A | * | 7/1994 | Maurer et al. .............. 208/430 |
| 5,441,559 A | | 8/1995 | Petit et al. |
| 5,529,763 A | | 6/1996 | Peng et al. |
| 5,529,970 A | | 6/1996 | Peng |

(List continued on next page.)

FOREIGN PATENT DOCUMENTS

| | | |
|---|---|---|
| EP | 0737648 A2 | 10/1996 |
| WO | WO 99/28013 | 6/1999 |
| WO | WO 00/16425 | 3/2000 |

OTHER PUBLICATIONS

Sircar, S. M. Anand, B. T. Carvill, J. R. Hufton, S. Mayorga, and R. N. Miller, "Sorption Enhanced Reaction Process for Production of Hydrogen," Proc., U.S. DOE Hydrogen Program Rev., 1, 815 (1995).

(List continued on next page.)

Primary Examiner—Jerry D. Johnson
Assistant Examiner—Basia Ridley
(74) Attorney, Agent, or Firm—Cary W. Brooks; Linda M. Deschere

(57) ABSTRACT

An apparatus removes CO from a hydrogen-rich gas stream in a hydrogen fuel cell system. CO fouls costly catalytic particles in the membrane electrode assemblies. Both a catalyst adapted to perform a water gas shift reaction, and a carbon dioxide adsorbent are disposed in a rotating pressure swing adsorber housing. The adsorption of carbon dioxide shifts equilibrium toward carbon monoxide consumption. A second adsorbent may be disposed in the housing for adsorbing carbon monoxide at low temperatures, and is adapted to desorb carbon monoxide at high temperatures. The present invention advantageously eliminates a unit operation from a space-constrained fuel cell vehicle by combining the WGS catalyst and a $CO_2$ adsorbent in a single reactor/housing. The apparatus further eliminates the use of a PROX reactor, by providing an apparatus which incorporates $CO_2$ adsorption and consequent carbon monoxide consumption in the place of the PROX reactor.

34 Claims, 4 Drawing Sheets

U.S. PATENT DOCUMENTS

| | | | |
|---|---|---|---|
| 5,632,807 A | | 5/1997 | Tomita et al. |
| 5,646,305 A | | 7/1997 | Wagner et al. |
| 5,656,566 A | * | 8/1997 | Ward .......................... 502/316 |
| 5,876,486 A | | 3/1999 | Steinwandel et al. |
| 5,891,217 A | | 4/1999 | Lemcoff et al. |
| 5,958,109 A | | 9/1999 | Fuderer |
| 6,103,143 A | * | 8/2000 | Sircar et al. ................. 252/373 |
| 6,162,558 A | | 12/2000 | Borup et al. |
| 2002/0004157 A1 | | 1/2002 | Keefer et al. |
| 2002/0110504 A1 | * | 8/2002 | Gittleman et al. .......... 422/190 |

OTHER PUBLICATIONS

Carvill, B. T., J. R. Hufton, M. Anand, and S. Sircar, "Sorption Enhanced Reaction Process", AIChE J., 42(10), 2765 (1996).

Hufton, J. R., S. Mayorga, and S. Sircar, "Sorption Enhanced Reaction Process for Hydrogen Production", AIChE J., 45(2), 248 (1999).

Iyuke, S. E., Daud, W.R.W., Mohamad, A.B., Kadhum, A.A.H., Fisal, Z., Shariff, A. M., "Application of Sn–activated carbon in pressure swing adsorption for purification of H2," Chemical Engineering Science 55 (2000) 4745–4755.

Ding, Y., Alpay, E., "Equilibria and Kinetics of CO2 Adsorption on Hydrotalcite Adsorbent," Chemical Engineering Science 55 (2000) 3461–3474.

Ding, Y., Alpay, E., "Adsorption–Enhanced Steam–Methane Reforming," Chemical Engineering Science 55 (2000) 3929–3940.

* cited by examiner

COMBINED WATER GAS SHIFT REACTOR/CARBON DIOXIDE ADSORBER FOR USE IN A FUEL CELL SYSTEM

BACKGROUND OF THE INVENTION

The present invention relates generally to a fuel processor for a hydrogen fuel cell engine, and more specifically to such a processor which uses a combined water gas shift reactor/carbon dioxide ($CO_2$) adsorber.

In proton exchange membrane (PEM) fuel cells, hydrogen ($H_2$) is the anode reactant (i.e. fuel) and oxygen is the cathode reactant (i.e. oxidant). The oxygen can be either a pure form ($O_2$), or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and mixed with a proton conductive resin. The catalytic particles are typically costly precious metal particles. These membrane electrode assemblies are relatively expensive to manufacture and require certain conditions for effective operation. These conditions include proper water management and humidification, and control of catalyst fouling constituents, such as carbon monoxide (CO).

For vehicular applications, it is desirable to use a liquid fuel such as alcohols (e.g., methanol or ethanol), other hydrocarbons (e.g., gasoline), and/or mixtures thereof (e.g., blends of ethanol/methanol and gasoline) as the source of hydrogen for the fuel cell. Such liquid fuels for the vehicle are easy to store onboard, and there is a nationwide infrastructure for supplying liquid fuels. However, such fuels must be dissociated to release the hydrogen content thereof for fueling the fuel cell. The dissociation reaction is accomplished within a chemical fuel processor or reformer. The fuel processor contains one or more reactors wherein the fuel reacts with steam (and sometimes air) to yield a reformate gas comprising primarily hydrogen and carbon dioxide. For example, in the steam methanol reformation process, methanol and water (as steam) are ideally reacted to generate hydrogen and carbon dioxide. In reality, carbon monoxide is also produced requiring additional reaction processes. In a gasoline reformation process, steam, air and gasoline are reacted in a primary reactor which performs two reactions. One is a partial oxidation reaction, where air reacts with the fuel exothermally, and the other is a steam reforming reaction, where steam reacts with the fuel endothermically. The primary reactor produces hydrogen, carbon dioxide, carbon monoxide and water.

Reactors downstream of the primary reactor are required to lower the CO concentration in the hydrogen-rich reformate to levels tolerable in the fuel cell stack. Downstream reactors may include a water/gas shift (WGS) reactor and a preferential oxidizer (PROX) reactor. The PROX selectively oxidizes carbon monoxide in the presence of hydrogen to produce carbon dioxide ($CO_2$), using oxygen from air as an oxidant. Here, control of air feed is important to selectively oxidize CO to $CO_2$. Unfortunately, the preferential oxidation reactor is not 100% selective and results in consumption of hydrogen. The heat generated from the preferential oxidation reactor is at a low temperature, resulting in excess low-grade heat.

The operational gasoline fuel processor technologies to date do not meet automotive targets for start-up durations, mass, and volume. The start-up time for such a system is limited by the time delay until the combination of water gas shift and preferential oxidation reactors can supply stack grade hydrogen. The start-up duration is related to the mass of the catalyst system used for start-up and the energy needed to get the catalyst system up to its operating temperature. Another limitation of the current technology is the inability to utilize the low grade heat such a system generates. Any heat loss reduces the fuel processor efficiency.

There are further drawbacks with current fuel processor systems for hydrogen fuel cell systems. The water gas shift reaction is equilibrium limited, and accordingly, the carbon monoxide concentration leaving high temperature and low temperature water gas shift reactors is typically about 3 mole % and 1 mole %, respectively. Often, a fuel processor will contain a high temperature water gas shift reactor followed by a low temperature water gas shift reactor; or will have two low temperature water gas shift reactors, one running adiabatically and one running isothermally. The carbon monoxide concentration of the reformate must be further reduced to levels that are tolerable in a PEM fuel cell stack, typically less than about 100 ppm and preferably less than about 50 ppm by volume.

The two main methods for removing this carbon monoxide are preferential oxidation (PROX) to carbon dioxide (as discussed hereinabove) and pressure swing adsorption (PSA). Preferential oxidation reactors are difficult to control, and the carbon monoxide cannot be recovered for hydrogen generation. Additionally, air needs to be compressed for the preferential oxidation causing high power requirements, and the nitrogen in the compressed air dilutes the hydrogen product going to the fuel cell stack. In a pressure swing adsorption unit, the carbon monoxide that desorbs leaves the adsorber at a substantially lower pressure than it enters. The carbon monoxide therefore needs to be recompressed in order to be recycled back into the water gas shift reactor(s) for complete carbon monoxide conversion to hydrogen. The PSA system also requires a purge gas and/or a vacuum in order to regenerate the adsorbent.

Both PROX and PSA systems are large, giving an added incentive for eliminating a unit operation from a space-constrained fuel cell vehicle. Furthermore, both water gas shift and PROX reactors need to reach their operational temperatures in order to be efficient for carbon monoxide reduction. Thus, it is difficult to remove carbon monoxide from the reformate upon start up at ambient temperatures in a conventional fuel processing system.

Thus, it is desirable to provide a fuel processor for a hydrogen fuel cell engine which provides a means to eliminate a unit operation from a space-constrained fuel cell vehicle. It is also desirable to provide a means to reduce the carbon monoxide content under normal operation before entering the fuel cell stack, thereby eliminating the use of a preferential oxidizer (PROX) reactor or significantly reducing the size of any such reactor. It is also desirable to provide such a fuel processor which provides quick carbon monoxide uptake during start-up, thereby shortening start-up duration.

SUMMARY OF THE INVENTION

The present invention addresses the above-mentioned problems by providing an apparatus for removing carbon monoxide (CO) from a hydrogen-rich gas stream. In one aspect, the hydrogen-rich stream is produced in a hydrogen fuel cell system which further includes membrane electrode assemblies where such hydrogen is reacted with oxygen to produce electricity. CO fouls costly catalytic particles in the membrane electrode assemblies, as described hereinabove.

The apparatus comprises a housing which may be a rotating pressure swing adsorber. A catalyst, adapted to perform a water gas shift reaction, is disposed in the housing. A carbon dioxide adsorbent is also disposed in the housing. The adsorption of the carbon dioxide drives the reaction (i.e. carbon monoxide+water ⇌ carbon dioxide+hydrogen) toward production of carbon dioxide and hydrogen, thereby advantageously shifting equilibrium toward carbon monoxide consumption.

The apparatus may further comprise a second adsorbent disposed in the housing and adapted to adsorb carbon monoxide from the hydrogen-rich gas stream at low temperatures, and is adapted to desorb carbon monoxide at high temperatures.

The present invention advantageously eliminates a unit operation from a space-constrained fuel cell vehicle by combining the WGS catalyst and a $CO_2$ adsorbent in a single reactor/housing. In addition to eliminating a unit operation, the present invention further eliminates the use of a preferential oxidation (PROX) reactor or significantly reduces the size of any such reactor, by providing an apparatus which incorporates $CO_2$ adsorption (and consequent carbon monoxide consumption) in the place of the PROX reactor. The present invention provides a means to clean up carbon monoxide while minimizing hydrogen consumption and the concomitant, undesirable excess low grade heat generation. The present invention reduces start-up duration, and improves overall fuel processor efficiency during normal operation.

BRIEF DESCRIPTION OF THE DRAWINGS

Other objects, features and advantages of the present invention will become apparent by reference to the following detailed description and drawings, in which.

DETAILED DESCRIPTION OF THE PREFERRED EMBODIMENTS

Figure 1:
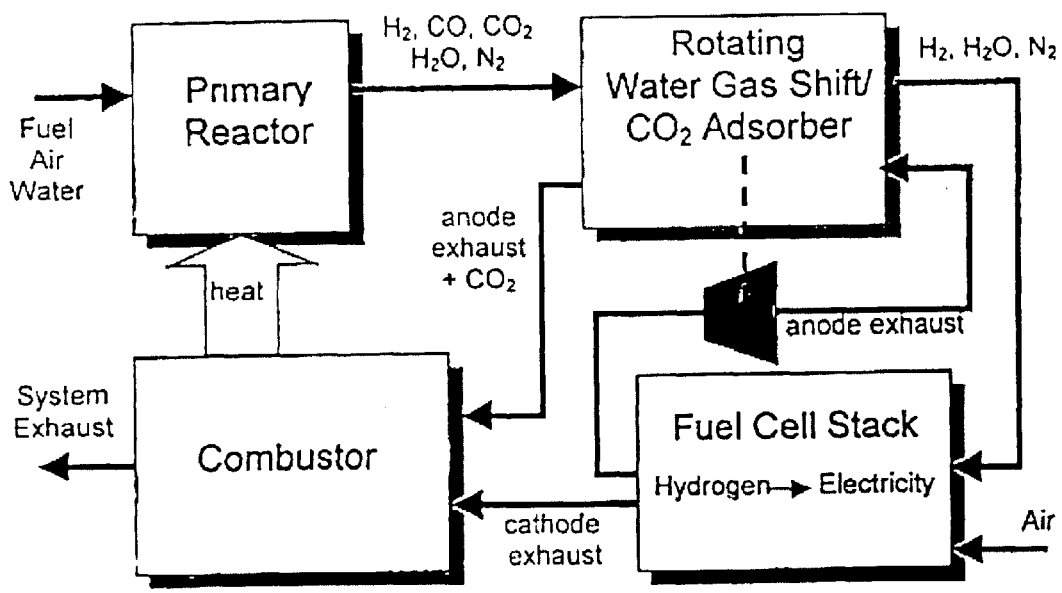
FIG. 1 is a simplified flow diagram of the fuel cell system of the present invention.

Referring now to FIG. 1, the present invention describes a novel fuel processor system for a hydrogen fuel cell vehicle. The invention uses a combined reactor/adsorber that combines a water gas shift catalyst with a carbon dioxide adsorbent for generating carbon monoxide-free hydrogen to be fed to an automotive fuel cell. The reactor/adsorber may also contain a carbon monoxide adsorbent for removing carbon monoxide at low temperatures during startup, before the water gas shift catalyst reaches its operational temperature. The carbon dioxide and carbon monoxide adsorbents in the reactor/adsorber are regenerated using the principles of Pressure Swing Adsorption (PSA) with a suitable purge gas such as exhaust from the fuel cell stack. The combined reactor/adsorber may be a rotating PSA device that allows for continuous production of carbon monoxide-free reformate from a single vessel. While the use of a rotary vessel for pressure swing adsorption has generally been known, its use for combining reaction and adsorption is one of the novel features of this invention.

The fuel processor consists of a steam reformer, a partial oxidation reactor, or combinations thereof to generate hydrogen from a hydrocarbon fuel such as gasoline, methane, or methanol, and the like. The carbon monoxide level in the $H_2$-rich reformate is reduced to very low levels in the inventive combined reactor/adsorber, thus eliminating the need for downstream carbon monoxide abatement such as preferential carbon monoxide oxidation (PROX) or carbon monoxide adsorption. The performance of the water gas shift catalyst in the combined reactor/adsorber is significantly enhanced compared to conventional water gas shift reactors. The improved water gas shift performance and the elimination of a unit for downstream carbon monoxide abatement significantly reduces the space needed for a fuel processor in a fuel cell vehicle.

Additionally, there are many control, cost, and thermal integration issues of preferential oxidation reactors, which are eliminated in this invention. A further advantage of this invention is the limited dilution of the hydrogen product. There is no carbon dioxide in the hydrogen reformate going to the fuel cell stack, and there is also less nitrogen in the hydrogen going to the stack than in conventional systems, as no air is required for preferential oxidation of carbon monoxide.

The water gas shift reaction (Equation (1) below) is commonly used for producing hydrogen from carbon monoxide generated by steam reforming and/or partial oxidation. This is a reversible, equilibrium-limited reaction, and thus will be hindered as more carbon dioxide is generated in the product. By eliminating the carbon dioxide by adsorption from the gas in a water gas shift reactor, the water gas shift reaction can progress completely to its equilibrium products: carbon dioxide and hydrogen.

$$CO+H_2O \rightleftharpoons CO_2+H_2 \qquad (1)$$

Depending on the catalyst, the water gas shift reaction can occur over two different temperature ranges. The high temperature shift (HTS: 320° C.–500° C.) typically uses a $Fe_3O_4/Cr_2O_3$ catalyst, whereas the low temperature shift (LTS: 150° C.–250° C.) typically uses a $CuO/ZnO/Al_2O_3$ catalyst.

The concept of combining reaction and adsorption in a single unit operation is described in the literature. See, for example Sircar, S., M. Anand, B. T. Carvill, J. R. Hufton, S. Mayorga, and R. N. Miller, "Sorption Enhanced Reaction Process for Production of Hydrogen," *Proc. U.S. DOE Hydrogen Program Rev.*, 1, 815 (1995); Carvill, B. T., J. R. Hufton, M. Anand, and S. Sircar, "Sorption Enhanced Reaction Process," *AIChE J.*, 42(10), 2765 (1996); European Patent No. 0 737 648 issued to Anand et al; and Hufton, J. R., S. Mayorga, and S. Sircar, "Sorption Enhanced Reaction Process for Hydrogen Production," *AIChE J.*, 45(2), 248 (1999). This concept has been demonstrated for hydrogen production by steam reforming of methane. See, for example, Anand, M., J. R. Hufton, S. Mayorga, S. Nataraj, S. Sircar, and T. R. Gaffney, "Sorption Enhanced Reaction Process of Production of Hydrogen," *Proc. U.S. DOE hydrogen Program Rev.*, 1, 537 (1996). The authors were able to generate 95 mol % hydrogen with less than 50 ppm carbon monoxide by mixing a steam-methane reforming catalyst with a carbon dioxide adsorbent and running a pressure swing adsorption cycle between 400° C. and 500° C. In the systems of the above five references, the combined reactor/adsorbers consist of a minimum of two and a maximum of twelve static vessels.

In contrast to the concepts taught in the literature, the process of the present invention uses a combined reactor/adsorber containing a water gas shift catalyst (preferably a high temperature shift catalyst) combined with a carbon dioxide adsorbent to generate CO-free hydrogen.

The concept of combining reaction and adsorption in a single unit has recently been explored. The difficulty is that adsorbents and catalysts have independent reaction kinetics which are temperature dependent. One approach is to attempt adsorption in a methane/steam reforming vessel operated at a narrow temperature of 400 to 500° C. This approach is not feasible for other hydrocarbon feed stocks. For example, gasoline is typically reformed at temperatures greater than 650° C. The $CO_2$ adsorbents of the present invention do not operate effectively at temperatures above 500° C. Thus, $CO_2$ adsorption in a gasoline reformer is not practical. This difficulty is overcome by the present invention by using a combined water gas shift reactor/$CO_2$ adsorber operating at a temperature at which the $CO_2$ adsorbent(s) operate effectively downstream of a reformer, whereby complete conversion of CO can be achieved in any system where hydrocarbons are reformed to $H_2$ and CO. Thus, the present invention provides good quality hydrogen-rich product stream independent of the fuel used and unencumbered by prior difficulties of adsorption in a reformer vessel. In the present invention, regardless of the hydrocarbon fuel to be reformed upstream of the reactor/adsorber unit, the temperature of the water gas shift reaction is dependent only on the catalyst used in the reactor/adsorber unit. High temperature water gas shift catalyst such as the exemplary $Fe_3O_4/Cr_2O_3$ operate in the same temperature regime (320 to 500° C.) as the exemplary $CO_2$ adsorbent(s) described in the present invention.

Another novel feature of the present invention is the use of a rotary pressure swing adsorber (PSA) for the combined reaction/adsorption process. Conventional adsorption processes use fixed bed PSA apparatus, with the number of beds ranging from 2 to 12. These fixed bed systems typically have cycle times of a minute or more. However, in order to meet the size requirements of a compact system, such as an automotive system, relatively compact PSA systems are required. In addition, relatively short PSA cycle times, such as on the order of about 1 second, are required to provide relatively rapid processing and response time in a dynamic environment, such as in an automotive application. The exemplary rotary reactor adsorber system of the present invention facilitates the attainment of relatively short cycle time and compactness.

In the present invention, hydrogen is generated as a product from a steam reformer, a partial oxidation reactor or combinations thereof, and then fed into a combined water gas shift reactor/$CO_2$ adsorber. Although not as preferred, in an alternate embodiment of the present invention, a two bed PSA system may be used. One vessel would be producing hydrogen from carbon monoxide and water, while the other is regenerated using the principles of pressure swing adsorption.

Figure 3:
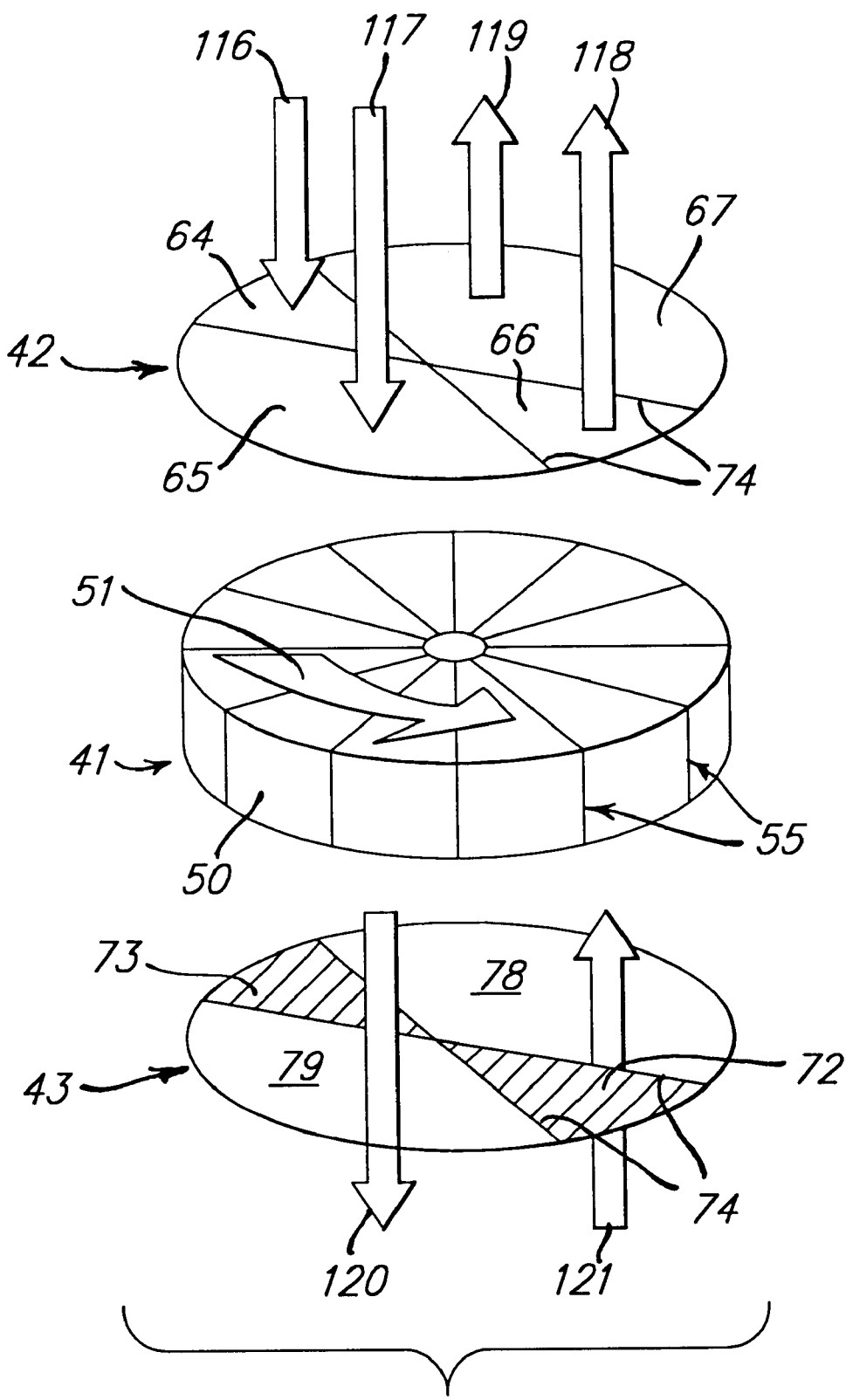
FIG. 3 is a partially schematic, perspective view of the combined rotary water gas shift reactor/adsorber of the preferred embodiment of the present invention.

In the preferred embodiment, as shown in FIG. 3, a single rotating housing/vessel is used, in which both production and regeneration can occur simultaneously, thus creating a potentially much smaller and more efficient unit. Also, several valves and additional piping that would normally be required in a multiple vessel PSA system are eliminated, thereby further reducing the space required for the fuel processor in a fuel cell powered vehicle.

Figure 2:
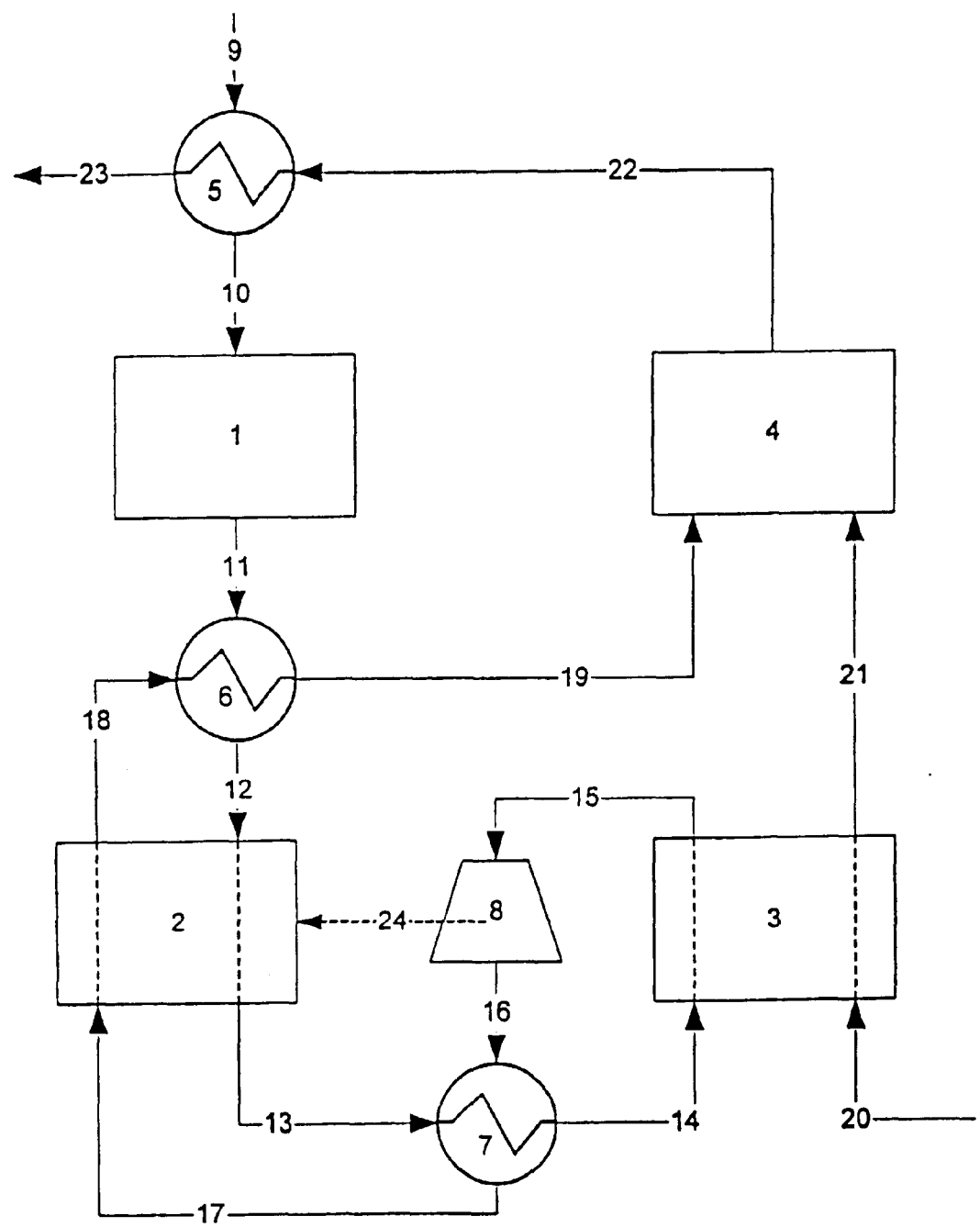
FIG. 2 is a more detailed flow diagram of the fuel cell system of the present invention.

A detailed schematic flow diagram of a preferred embodiment of the fuel cell engine system of the present invention is shown in FIG. 2. Included in the description are some possible variations from the preferred embodiment.

Liquid fuel, such as alcohols (e.g., methanol or ethanol), other hydrocarbons (e.g., gasoline) and/or mixtures thereof (e.g., blend of methanol/ethanol and gasoline), is fed into the fuel cell engine along with air and steam in stream 9. The fuel/water/air moisture, stream 9, is heated in heat exchanger 5 to the temperature required for feed into primary reactor 1. The temperature depends on the nature of the fuel and the relative compositions of fuel, air and water. The heat required to raise the temperature of stream 9 comes from stream 22, which is effluent from combustor 4. The fuel/water/air mixture leaves heat exchanger 5 as stream 10 and is fed to primary reactor 1. Alternatively, the fuel, air and water can all be heated separately and mixed together in or before the primary reactor.

Primary reactor 1 contains a steam reforming and/or partial oxidation catalyst suitable for the specific fuel used. In primary reactor 1, the fuel is converted to hydrogen either by partial oxidation, steam reforming, or autothermal reforming. The reformate gas leaving the primary reactor in stream 11 contains primarily hydrogen, nitrogen, carbon monoxide, carbon dioxide, and water. The carbon monoxide concentration in stream 11 is typically 5–20 mole %. Stream 11 is cooled in heat exchanger 6 to the operational temperature of combined water gas shift reactor/$CO_2$ adsorber 2. Stream 11 is cooled in heat exchanger 6 by exhaust purge gas 18 from combined reactor/adsorber 2. The cooled reformate gas exits heat exchanger 6 as stream 12. One alternative (not shown in FIG. 2) allows for additional water to be fed directly into combined reactor/adsorber 2 or blended with stream 12 as required by the water gas shift reaction.

Water gas shift reactor/adsorber 2 is preferably a rotating vessel for pressure swing adsorption using hardware that has been described in the literature. See, for example, U.S. Pat. No. 5,441,559 issued to Petit et al.; and PCT Patent Publication No. WO 99/28013 by Keefer et al., each of the disclosures of which are incorporated herein by reference in its entirety. The PSA cycle used in the reactor/adsorber vessel is described in detail below. This reactor/adsorber 2 converts essentially all of the carbon monoxide to carbon dioxide, and the carbon dioxide is adsorbed and then purged from the reactor/adsorber 2 using anode exhaust stream 15 from fuel cell stack 3.

The product gas, stream 13, from water gas shift reactor/adsorber 2 contains primarily hydrogen, nitrogen, and water, with only trace amounts of carbon monoxide and carbon dioxide, preferably less than about 50 ppm of each. Reformate stream 13 is cooled in heat exchanger 7 to the operating temperature of fuel cell stack 3. Stream 13 is cooled in heat exchanger 7 to about 60° C.–100° C. by the expanded anode exhaust stream 16 from isothermal expander 8. The cooled reformate 14 is fed into the anode side of fuel cell stack 3. Inside the stack, the hydrogen from reformate 14 reacts with oxygen from air stream 20 to generate electricity to power the vehicle. Stream 20 is wet air at the operating temperature of fuel cell stack 3 and is fed into the cathode side of the stack.

The fuel cell stack 3 generates exhaust gases from both the anode and cathode sides. The anode exhaust, stream 15, contains hydrogen, nitrogen, and water at about 2 bar absolute pressure. Anode exhaust 15 is expanded to atmospheric pressure in isothermal expander 8 to be used as a purge gas, stream 16, for carbon dioxide desorption from water gas shift reactor/adsorber 2. Other means for reducing the pressure of stream 15 can be employed, such as any variety of valves, nozzles, orifices, or the like. If an isothermal expander is used, the energy generated in expander 8, stream 24, can potentially serve to drive the rotor in adsorber 2 should a rotary adsorber be used (see below), although this is not essential for the function of the process. Alternatively, gas from the cathode exhaust, stream 21, which contains primarily nitrogen, oxygen, and water, could be expanded and used as a purge gas for carbon dioxide desorption, although this raises potential safety issues by flowing a stream containing oxygen into a vessel which contains hydrogen. This alternative is not shown in FIG. 2.

According to the invention, any gas stream or combination of gas streams that does not contain a significant amount of carbon dioxide may be used as a purge gas for regeneration of the carbon dioxide adsorbent. Other alternative purge streams include steam, air, nitrogen, hydrogen, or a split fraction of the product gas from the combined reactor/adsorber (stream 13). The purge stream must be at a lower pressure than the feed stream (stream 12) and at about the same temperature as the feed. In this embodiment of the invention, cathode exhaust 21 is fed directly into combustor 4.

The energy generated, stream 24, in expander 8 can potentially serve to drive the rotor in the rotating water gas shift reactor/adsorber 2, although this is not essential for the function of the process. The expanded anode exhaust, stream 16, is heated in heat exchanger 7 so as to enter reactor/adsorber 2 at essentially the same temperature as the feed gas, stream 12, to the reactor/adsorber. The heated anode exhaust, stream 17, from heat exchanger 7, serves as a purge gas to remove carbon dioxide from reactor/adsorber 2.

The purge gas exhaust, stream 18, from water gas shift reactor/adsorber 2 is heated in heat exchanger 6 by the reformate product 11 from primary reactor 1. The heated exhaust, stream 19, from heat exchanger 6 is fed to combustor 4. In combustor 4, hydrogen from stream 19 is burned using oxygen from cathode exhaust stream 21. The combustor may or may not contain a catalyst for hydrogen combustion. The combustion reaction is highly exothermic, and the combustor product, stream 22, is a hot stream containing primarily water, nitrogen and carbon dioxide. Combustor exhaust 22 is fed into heat exchanger 5, where it heats feed stream 9. The combustor exhaust is cooled in heat exchanger 5 and leaves the system as stream 23. Stream 23 may be vented out of the vehicle's tailpipe, but preferably the water in stream 23 is recovered and used in the feed to the fuel processor system in stream 9 or elsewhere in the process. Thus, the vehicle's exhaust gas is made up of nitrogen and carbon dioxide. Alternatively, water may be recovered directly from cathode exhaust stream 21 before entering combustor 4.

The present invention is not intended to be limited to the specifics of the systems as shown in the Figures, as many changes and variations to these embodiments may be made without departing from the inventive concept. For example, additional heating and cooling and the order of heat exchange and expansion of any stream other than that described may be easily accomplished. Also, water may readily be recovered from a variety of streams, including streams 13 to 17, 19, 21, and 23 for reintroduction into the system.

In the combined water gas shift reactor/adsorber 2, a high temperature or a low temperature water gas shift catalyst and a carbon dioxide adsorbent are combined in a single housing/vessel to promote complete conversion of carbon monoxide. A preferred embodiment of the invention utilizes a high temperature water gas shift catalyst, which has faster kinetics than a low temperature water gas shift catalyst. The faster kinetics allow for a smaller reactor/adsorber vessel by utilizing less catalyst. The combining of materials can be accomplished by mixing distinct particles, such as beads or extrudates, of adsorbent and catalyst. The materials may also be preferably formed together into a single particle, such as a bead or an extrudate, or, most preferably, formulated into monoliths, foams, honeycombs or the like. The mixture of adsorbent and catalyst may range, by weight, from 95% catalyst and 5% adsorbent to 5% catalyst and 95% adsorbent, i.e., the weight ratio of adsorbent to catalyst is roughly between about 1:20 and about 20:1. A desirable range of adsorbent to catalyst weight ratio is 1:10 to 5:1. A preferred range of adsorbent to catalyst weight ratio is 1:10 to 1:1.

The vessel(s) may consist of an initial layer that only contains the water gas shift catalyst followed by a layer of mixed catalyst/adsorbent, an initial layer that only contains the adsorbent followed by a layer of mixed catalyst/adsorbent, or may be filled completely with the catalyst/adsorbent mixture. The relative amounts of adsorbent and catalyst may vary throughout the vessel.

The water gas shift catalyst can be any catalyst typically used for high or low temperature water gas shift. Preferably, a high temperature shift catalyst, such as $Fe_3O_4/Cr_2O_3$, is used.

Preferential carbon dioxide adsorbents include the metal or mixed metal oxides of magnesium, calcium, manganese, and lanthanum and the clay minerals such as dolomite and sepiolite, see European Patent No. EP 0 737 648 issued to Anand et al, the disclosure of which is incorporated herein in its entirety. Thus, the carbon dioxide adsorbent may be selected from the group consisting of magnesium, calcium, manganese, lanthanum, magnesium oxide, calcium oxide, manganese oxides, lanthanum oxides, clay minerals, and mixtures thereof. As a further example, a hydrotalcite-based material promoted with potassium carbonate may be used to reversibly adsorb carbon dioxide at temperatures between about 300° C.–500° C. (see, for example, Anand, M., J. R. Hufton, S. Mayorga, S. Nataraj, S. Sircar, and T. R. Gaffney, "Sorption Enhanced Reaction Process of Production of Hydrogen," *Proc. U.S. DOE hydrogen Program Rev.*, 1, 537 (1996), which is incorporated herein by reference in its entirety). The hydrotalcite-based material is also resistant to steam.

Additionally, the reactor/adsorber 2 may also contain a carbon monoxide adsorbent that will adsorb carbon monoxide at temperatures below the activation temperature of the water gas shift catalyst. This will ensure that carbon monoxide will not break through the reactor/adsorber 2 during start-up from ambient temperatures, when the water gas shift catalyst is still relatively cold, until the operating temperature of the combined reactor/adsorber was maintained. The carbon monoxide adsorbent will have a much lower capacity for carbon monoxide at the higher steady-state operating temperature of the combined reactor/adsorber.

A layer of the carbon monoxide adsorbent may be placed in front of the mixture of water gas shift catalyst and carbon dioxide adsorbent, or the three materials may be combined into a single layer. Alternatively, a layer consisting of mixtures of either the water gas shift catalyst and carbon dioxide adsorbent or of all the three materials may follow a first layer consisting of a mixture of the carbon monoxide and carbon dioxide adsorbents. The carbon monoxide adsorbent may be a metal oxide or metal salt, such as copper, silver, or tin salt or oxide impregnated on activated carbon, alumina or a zeolite. See, for example, U.S. Pat. No.

4,917,711 issued to Xie et al.; U.S. Pat. No. 4,696,682 issued to Hirai et al; U.S. Pat. No. 4,587,114 issued to Hirai et al.; and U.S. Pat. No. 5,529,763 issued to Peng et al., each of the disclosures of which is incorporated herein by reference in its entirety. The carbon monoxide would be regenerated from the adsorbent during start-up at relatively low temperatures using the basic principles of pressure swing adsorption as described below.

The carbon monoxide adsorbents listed above might selectively adsorb water instead of carbon monoxide at low temperatures. In order to protect the carbon monoxide adsorbent from water, a layer of a desiccant may be placed in the combined reactor/adsorber vessel upstream of the carbon monoxide adsorbent. The desiccant may be any conventional water adsorbent such as zeolite molecular sieves, activated alumina, silica gels, or mixtures thereof. The water is adsorbed at relatively low temperatures during the vehicle start-up before it reaches the carbon monoxide adsorbent. The water is regenerated from the desiccant during start-up using the principles of pressure swing adsorption as described below.

Conventional pressure swing adsorption (PSA) systems are very large and consist of a minimum of two separate adsorption vessels, complete with numerous valves and manifolds. In a two-vessel system, one vessel would be in the production mode, and the second vessel would be in various stages of depressurization or blowdown, purge, and pressurization. Many commercial hydrogen PSA cycles use four beds, with one bed in the production stage at any given time, and the other three beds in various stages of equalization, blowdown, purge, and pressurization. See, for example, U.S. Pat. No. 5,646,305 issued to Wagner; and U.S. Pat. No. 3,564,816 issued to Batta. Also, some commercial hydrogen PSA cycles use twelve beds, with four beds in the production stage at any given time, and the other eight beds in various stages of equalization, blowdown, purge and pressurization. See, for example, U.S. Pat. No. 5,958,109 issued to Fuderer et al. These PSA cycle stages are described in detail below.

It is well known that PSA systems with more than two vessels exhibit higher hydrogen recoveries and reduced power by incorporating pressure equalization steps. These fixed-bed PSA systems, however, contain complex valve arrangements and are non-continuous due to the cycling of these valves. Alternatively, rotating adsorber vessels allow for continuous production in a relatively small system with minimum valving. Rotating pressure swing adsorption systems are described by Petit et al. in U.S. Pat. No. 5,441,559; and Keefer et al. in PCT Publication No. WO 99/28013.

In order for the water gas shift reactor/adsorber 2 to be small enough to fit in a vehicle, this invention preferably uses a single rotation vessel with only two fixed valve faces. Rotation of the vessel allows the catalyst/adsorbent mixture to cycle between fixed regions for production, depressurization, purge and pressurization (as described below) with cycle times much smaller than those of conventional PSA systems. Whereas the use of a rotary vessel for pressure swing adsorption has been previously described in the literature, its use for combining reaction and adsorption is one of the novel features of this invention, as stated hereinabove. Further features of the rotary reactor/adsorber are described below with reference to FIG. 3. The cycle in which the reactor/adsorber is used will now be described.

The feed gas to the adsorber is the product from the primary reactor described above. Additional steam may be added directly into the reactor/adsorber feed. The feed typically contains hydrogen, carbon monoxide, carbon dioxide, water and nitrogen. The carbon monoxide concentration will range from about 5 mole % to about 20 mole %. The carbon dioxide concentration will range from about 0 mole % to about 15 mole %. The combined reactor/adsorber 2 needs to adsorb substantially all of the carbon dioxide that enters the vessel with the primary reactor product and substantially all of the carbon dioxide that is generated from carbon monoxide via equation (1). The feed preferably enters the reactor/adsorber vessel between about 300° C.–550° C. and between about 2 atm–5 atm.

The cycle stages for the combined water shift reactor/$CO_2$ adsorber are as follows:

Production

During the production step, the carbon monoxide and the water in the feed gas react via equation (1) to form carbon dioxide and hydrogen. The carbon dioxide in the primary reactor product and the carbon dioxide formed via the water gas shift reaction adsorb on the adsorbent. The carbon dioxide is thus eliminated from the gas phase, driving the water gas shift reaction further toward the products. As the carbon dioxide is adsorbed, the adsorbent nearest the inlet of the vessel becomes saturated with carbon dioxide, and the water gas shift reaction reaches equilibrium at the bed inlet. The reaction front then moves toward the bed outlet. The product gas leaving the bed will contain hydrogen, water, nitrogen, and less than about 100 ppm carbon monoxide. Preferably, the product gas will contain less than about 50 ppm carbon monoxide. The production step is stopped before carbon dioxide breaks through the outlet of the reactor/adsorber vessel. At the end of the production step, the adsorbent is nearly saturated with carbon dioxide, and the vessel is pressurized with hydrogen, carbon monoxide, water, and nitrogen. At start-up, carbon monoxide is adsorbed on the low temperature CO adsorbent during the production step.

Depressurization

The reactor/adsorber vessel is depressurized from the feed pressure to the purge pressure by exhausting the gas in the direction counter-current to the production direction. During depressurization, the outlet of the reactor/adsorber vessel is sealed. Alternatively, the vessel can be depressurized co-currently, and the vessel inlet is sealed. The depressurizing exhaust gas contains hydrogen, carbon monoxide, carbon dioxide, water and nitrogen. The exhaust will exit the reactor/adsorber vessel at atmospheric pressure and can be sent to the combustor.

Purge

The reactor/adsorber vessel is purged with the expanded and heated exhaust from the PEM fuel cell stack or other suitable purge gas described above in the direction counter-current to the production direction at ambient pressure. The exhausted purge gas, which will contain most of the adsorbed carbon dioxide, is sent to the combustor. The purge step is terminated when essentially all of the carbon dioxide has been removed from the adsorbent. During start-up, the carbon monoxide is desorbed from the low temperature CO adsorbent during the purge step.

Pressurization

The reactor/adsorber vessel is pressurized back up to the production pressure in the same direction as the production step using the hydrogen-rich product from the primary reactor. During pressurization, the outlet of the vessel is sealed. Alternatively, the vessel may be pressurized with the hydrogen-rich product from the reactor/adsorber in a direction counter-current to the production direction, and the vessel inlet is sealed. After pressurization, the reactor/adsorber returns to the production step, and the cycle repeats.

Equalization stages, which are well known to those skilled in the art of PSA systems, may be added to the reaction/adsorption cycle to enhance hydrogen recovery. For example, one bed that has just completed the production step may be equalized, or connected via the outlet of both beds, with another bed that has just completed the purge step. During the equalization, the pressure in the first bed is reduced, and the pressure in the second bed is increased accordingly. Also, the hydrogen remaining in the first bed at the end of production is partially recovered in the second bed, which has completed the purge step.

An exemplary rotary reactor/adsorber is shown in FIG. 3.

Rotary/adsorber Reactor

A simplified schematic of an exemplary rotary adsorption apparatus is shown in FIG. 3. The rotary adsorber comprises a wheel 41 of adsorbent and catalytic material; an upper valve face 42; and a lower valve face 43. The adsorbent/catalytic wheel 41 is simply referred to as wheel 41 hereinafter. Upper valve face 42 will be in direct contact with the top of wheel 41 and lower valve face 43 will be in direct contact with the bottom of wheel 41. The wheel and the two valve faces form an assembly that is enclosed in a housing (not shown) in FIG. 3.

Wheel 41 is made up of pie shaped compartments 50. Preferably, there are a minimum of twelve such adsorbent compartments. The compartments 50 are separated from each other by walls 55. The walls 55 prevent intercompartmental (tangential) flow, thus ensuring that the gases flow only in the axial direction through wheel 41. Wheel 41 rotates in the counterclockwise direction as indicated by arrow 51. Wheel 41 is rotated either by a rotor (not shown) that passes through the center of the wheel or a belt (not shown) in contact with the outer housing of the wheel. Stationary valve faces 42 and 43 do not move as wheel 41 rotates.

Upper valve face 42 is divided into subsections 64, 65, 66, and 67. These subsections are open windows that allow gas to flow through. Subsections 64, 65,66, and 67 are separated by barrier seals 74. Barrier seals 74 prevent gas from flowing between the subsections. Stream 116 is the feed gas for the pressurization step of the PSA cycle and flows through subsection 64. Stream 117 is the feed gas for the production step of the PSA cycle and flows through subsection 65. Stream 118 is the exhaust gas from the depressurization step of the PSA cycle and flows through subsection 66. Stream 119 is the exhaust gas from the purge step of the PSA cycle and flows through subsection 67.

Lower valve face 43 is divided into subsections 72, 73, 78, and 79. Subsections 78 and 79 are open windows that allow gas to flow through. Subsections 72 and 73 are solid faces that prevent gases from flowing through. Subsections 72,73,78, and 79 are separated by barrier seals 74. Barrier seals 74 prevent gas from flowing between the subsections. Stream 120 is the product gas from the production step of the PSA cycle and flows through subsection 79. Stream 121 is the feed gas for the purge step of the PSA cycle and flows through subsection 78. Solid face of subsection 73 prevents gas from entering or exiting the bottom of wheel 41 during the pressurization step of the PSA cycle. Solid face of subsection 72 prevents gas from entering or exiting the bottom of wheel 41 during the depressurization step of the PSA cycle.

The rotary adsorber system shown in FIG. 3 is a basic, generic device shown here for the purpose of identifying the key features of a rotary adsorber and their functions. There are many variations to the device not shown in FIG. 3 that would provide a suitable device for use in the fuel processing system of the invention.

In one aspect, stream 116 of FIG. 3 is constituted by a part of stream 12 of FIG. 2. In another aspect, stream 117 of FIG. 3 is essentially the same as stream 12 of FIG. 2. Similarly, in one aspect, stream 118 of FIG. 3 is constituted by a part of stream 18 of FIG. 2. As shown here, stream 119 for exhaust gas purge is essentially the same as stream 18 of FIG. 2. Finally, stream 120 of FIG. 3 is essentially the same as stream 13 of FIG. 2; and stream 121 of FIG. 3 is essentially the same as stream 17 of FIG. 2.

The pressurization and depressurization steps require a relatively small flow stream and, therefore, as illustrated here, a portion of the streams recited earlier with respect to FIG. 3, namely stream 116 and stream 118, respectively, are used. However, other methods could be used to accomplish the pressurization and depressurization steps. Thus, streams 116 and 118 are relevant to the overall process in that they facilitate operation of the rotary reactor adsorber system. The key features described here pertain to processing of a feed stream designated as stream 12 of FIG. 2 and stream 117 of FIG. 3, to provide a product stream designated as stream 13 of FIG. 2 which is cooled to provide anode feed stream 14 of FIG. 2. Stream 13 of FIG. 2 corresponds to stream 120 of FIG. 3.

EXAMPLES

In the following examples, pressure swing adsorption (PSA) cycles were run using a 75:25 ratio by weight of a water gas shift catalyst and a $CO_2$ adsorbent. The catalyst was 6 mm×3 mm tabs of Süd Chemie C12-4-02 commercial catalyst. The adsorbent was ⅛" extrudates of a layered double hydroxide from Air Products and Chemicals, Inc. 53.7 g of the adsorbent catalyst mixture were loaded into a 1" diameter stainless steel tube, with a packed height of 5.5". The column was placed in a tube furnace to control the temperature. The furnace was set so that the temperature of the adsorbent catalyst mixture was uniformly 425° C. at the start of each experiment. The mixture was activated in a flowing mixture of 3% $H_2$ and 97% $N_2$ at 350° C. for no less than 120 minutes before the first experiment. The mixture was activated in flowing $N_2$ at 425° C. for no less than 120 minutes before subsequent experiments. The PSA cycles of production, depressurization, purge, and pressurization as described in the detailed description section were repeated numerous times for each example at the conditions given. Both the production and purge inlet flow rates were 2 SLPM for all examples. The molar feed composition was that typically exiting primary reactor 1, and was kept at 33% $H_2$, 23% $H_2O$, 10% CO, 9% $CO_2$, and 24% $N_2$ for all examples. The pressure of the production step was always 30.3 psig and the pressure of the purge step was always between 0–2 psig. The flow direction during the production step was always upwards from the bottom of the column, whereas the flow direction was downward from the top of the column during the purge, depressurization and pressurization steps. Note that no gas is introduced into the column during depressurization, but rather the column is allowed to depressurize by opening a valve at the bottom of the column. $H_2$, $CO_2$, and $N_2$ concentrations were measured using a Hiden HPR20 mass spectrometer from a sample port located in a line at the outlet (top) of the column during the production step. CO concentrations were measured from the same sample port using a Horiba AIA-210 CO analyzer. Temperatures were measured using thermocouples at four points within the column.

Example 1

Figure 4:
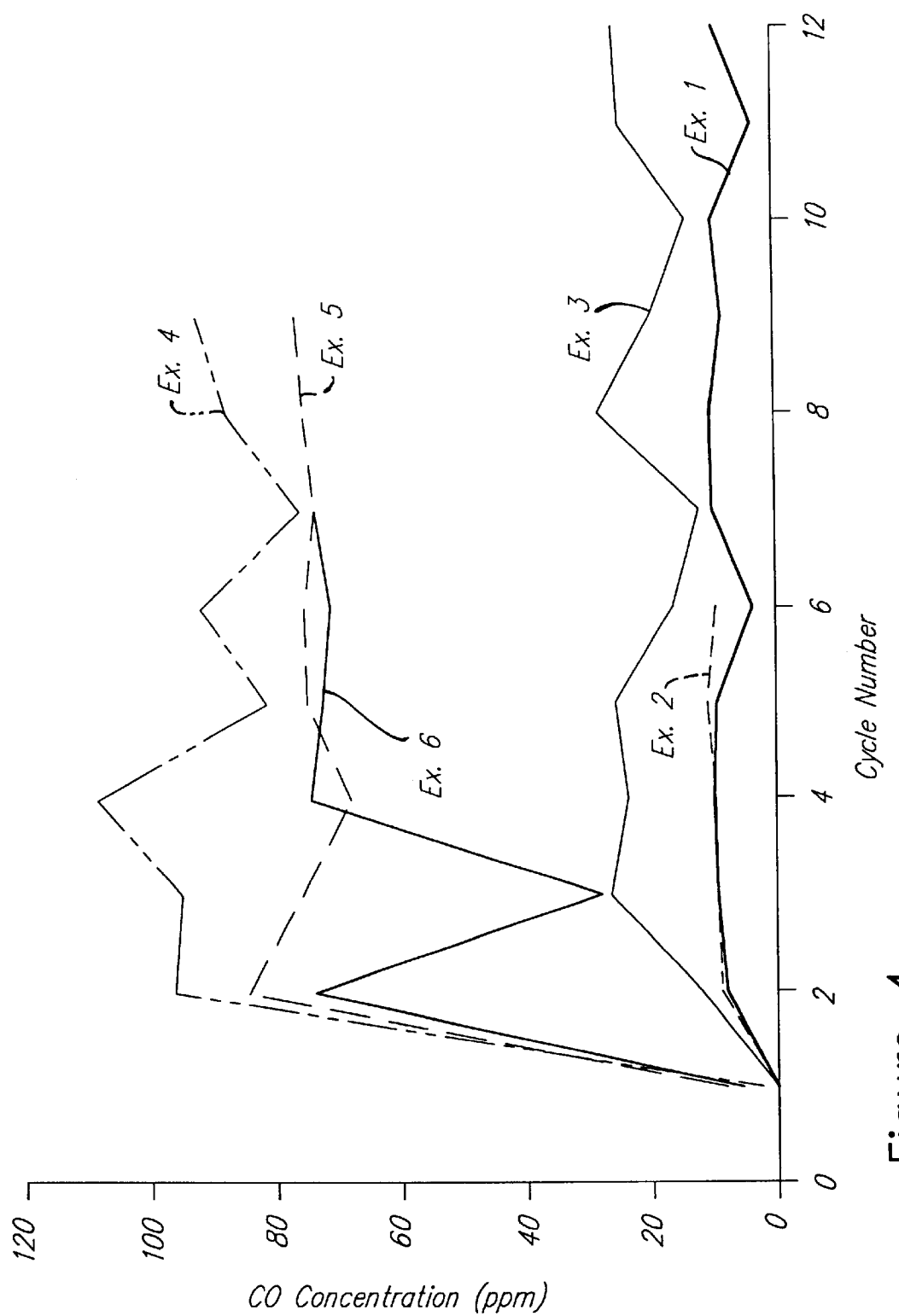
FIG. 4 is a graph containing plots of CO concentrations versus cycle number for experiments wherein pressure swing adsorption cycles were run using a mixture of water gas shift catalyst and a $CO_2$ (carbon dioxide) adsorbent.

The following cycle was run over adsorbent/catalyst mixture. Production for 40s; depressurization for 5s; purge with a gas mixture containing 50% $H_2O$ and 50% $N_2$ for 160s; and pressurization with pure $N_2$ for 30s. This cycle was repeated 9 times. The product from the production step consistently contained less the 10 ppm CO and no detectable $CO_2$. The results are shown in FIG. 4.

Example 2

The following cycle was run over adsorbent/catalyst mixture. Production for 60s; depressurization for 5s; purge with a gas mixture containing 50% $H_2O$ and 50% $N_2$ for 180s; and pressurization with pure $N_2$ for 30s. This cycle was repeated 6 times. The product from the production step consistently contained less the 11 ppm CO and no detectable $CO_2$. The results are shown in FIG. 4.

Example 3

The following cycle was run over adsorbent/catalyst mixture. Production for 60s; depressurization for 5s; purge with a gas mixture containing 50% $H_2O$ and 50% $N_2$ for 180s; and pressurization with pure $N_2$ for 60s. This cycle was repeated 12 times. The product from the production step consistently contained less the 28 ppm CO and no detectable $CO_2$. The results are shown in FIG. 4.

Example 4

The following cycle was run over adsorbent/catalyst mixture. Production for 60s; depressurization for 5s; purge with a gas mixture containing 10% $H_2$, 29% $H_2O$ and 61% $N_2$ for 180s; and pressurization with a gas mixture containing 10% $H_2$, 29% $H_2O$ and 61% $N_2$ for 25s. This cycle was repeated 9 times. The product from the production step consistently contained less the 108 ppm CO and no detectable $CO_2$. The results are shown in FIG. 4.

Example 5

The following cycle was run over adsorbent/catalyst mixture. Production for 60s; depressurization for 5s; purge with a gas mixture containing 10% $H_2$, 29% $H_2O$ and 61% $N_2$ for 240s; and pressurization with a gas mixture containing 10% $H_2$, 29% $H_2O$ and 61% $N_2$ for 50s. This cycle was repeated 9 times. The product from the production step consistently contained less the 85 ppm CO and no detectable $CO_2$. The results are shown in FIG. 4.

Example 6

The following cycle was run over adsorbent/catalyst mixture. Production for 60s; depressurization for 5s; purge with a gas mixture containing 10% $H_2$, 29% $H_2O$ and 61% $N_2$ for 480s; and pressurization with a gas mixture containing 10% $H_2$, 29% $H_2O$ and 61% $N_2$ for 25s. This cycle was repeated 7 times. The product from the production step consistently contained less the 75 ppm CO and no detectable $CO_2$. The results are shown in FIG. 4.

Advantages of a fuel system using a combined water gas shift reactor/$CO_2$ adsorber for hydrogen production for automotive fuel cell applications as compared to conventional methods include one or more of the following:

1) Elimination of downstream carbon monoxide abatement by preferential oxidation or adsorption, resulting in capital and space savings;
2) Elimination of low temperature water gas shift reactor;
3) Less complicated thermal integration than system with both a water gas shift and a preferential oxidation reactor;
4) More efficient use of water gas shift catalyst;
5) No dilution of hydrogen product with carbon dioxide;
6) No dilution of hydrogen product with nitrogen from air used for preferential carbon monoxide oxidation;
7) Elimination of air compression for preferential oxidation, resulting in power savings;
8) Elimination of low-grade excess heat generated by preferential oxidation;
9) Potential for removing carbon monoxide at start-up; and
10) The ability to control the adsorption unit's cycling rate to optimize efficiency over a wide range of operating loads.

While preferred embodiments, forms and arrangements of parts of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A system including an apparatus for removing carbon monoxide from a gas stream passing therethrough, the apparatus comprising:
   a wheel having a wall formed therein to separate said wheel into a plurality of compartments, each of said plurality of compartments having a catalyst for performing a water gas shift reaction and an adsorbent for adsorbing carbon dioxide and shifting equilibrium towards carbon monoxide consumption; and
   a valving including a first valve face disposed in a housing adjacent a first major face of said wheel and a second valve face disposed in said housing adjacent a second major face of said wheel;
   wherein said wheel is rotatable relative to said valving between a first position to permit axial flow through at least one of said plurality of compartments and a first pair of ports in said valving, a second position to permit axial flow through said at least one of said plurality of compartments and a second pair of ports in said valving, a third position to permit axial flow into said at least one of said plurality of compartments through a third port in said valving and a fourth position to permit axial flow from said at least one of said plurality of compartments through a fourth port in said valving.

2. The system as defined in claim 1 wherein the catalyst is adapted to perform the water gas shift reaction at high temperatures.

3. The system as defined in claim 1 wherein the system comprises a pressure swing adsorber.

4. The system as defined in claim 3 wherein the pressure swing adsorber comprises multiple, staged fixed beds.

5. The system of claim 1 which is a fuel cell system.

6. The system defined in claim 1 wherein the first position defines an adsorption region, the second position defines a purge region, the third position defines a pressurization region and the fourth position defines a depressurization region.

7. The system defined in claim 1 wherein the valving is fixed within the housing and the wheel rotates between the first valve face and the second valve face.

8. The system defined in claim 1 wherein each of said plurality of compartments further comprises a second adsorbent for adsorbing carbon monoxide.

9. The system as defined in claim 8 wherein the second adsorbent is selected from the group consisting of: oxides or salts of copper impregnated or exchanged on activated carbon, alumina, and zeolites; oxides or salts of silver impregnated or exchanged on activated carbon, alumina, and zeolites; oxides or salts of tin impregnated or exchanged on activated carbon, alumina, and zeolites; and mixtures thereof.

10. The system as defined in claim 8 wherein each of said plurality of compartments further comprises a desiccant material upstream of said second adsorbent.

11. The system as defined in claim 10 wherein the desiccant material is selected from the group consisting of zeolite molecular sieves, activated alumina, silica gels, and mixtures thereof.

12. The system as defined in claim 1 which further comprises an expander downstream of the wheel, and wherein the expander provides a purge gas to be fed back into the wheel.

13. The system as defined in claim 12 wherein the expander is an isothermal expander adapted to provide electrical power for rotating the wheel relative to the valving.

14. The system as defined in claim 12 further comprising a fuel cell stack having an anode exhaust, the expander operably disposed between the fuel cell stack and the wheel such that the anode exhaust is directed through the expander to wheel for providing the purge gas.

15. The system as defined in claim 1 wherein the adsorbent is selected from the group consisting of magnesium, calcium, manganese, lanthanum, magnesium oxide, calcium oxide, manganese oxides, lanthanum oxides, clay minerals, and mixtures thereof.

16. The system as defined in claim 1 wherein the adsorbent is clay minerals selected from the group consisting of dolomites, sepiolites, hydrotalcites, and mixtures thereof.

17. The system as defined in claim 16 wherein the clay minerals are hydrotalcites promoted with potassium carbonate and are adapted to reversibly adsorb carbon dioxide at temperatures between about 300° C. and about 500° C.

18. The system as defined in claim 1 wherein the catalyst is $Fe_3O_4/Cr_2O_3$.

19. The system as defined in claim 1 wherein the weight ratio of adsorbent to catalyst is between about 1:20 and about 20:1.

20. The system consisting essentially of the apparatus of claim 1 operably disposed between a primary reactor and a fuel cell stack.

21. A system including an apparatus for removing the carbon monoxide from a gas stream passing therethrough, the apparatus comprising:
a housing having a pair of valve faces fixed therein, each of said pair of valve faces defining an adsorption region, a depressurization region, a purge region and a pressurization region within said housing;
a wheel rotatably supported in said housing, said wheel having a wall formed therein to separate said wheel into a plurality of compartments, each of said plurality of compartments having a catalyst for performing a water gas shift reaction and an adsorbent for adsorbing carbon dioxide and shifting equilibrium towards carbon monoxide consumption;
wherein said wheel rotates within said housing between a first position to permit axial flow through said at least one of said plurality of compartments in said adsorption region, a second position to permit axial flow from said at least one of said plurality of compartments in said depressurization region, a third position to permit axial flow through said at least one of said plurality of compartments in said purge region, and a fourth position to permit axial flow to said at least one of said plurality of compartments in said pressurization region.

22. The system as defined in claim 21 wherein the system further comprises an expander downstream of the housing, and wherein the expander provides a purge gas to be fed back into the housing.

23. The system as defined in claim 22 wherein the expander is an isothermal expander.

24. The system as defined in claim 22 which further comprises a fuel cell stack having an anode exhaust, the fuel cell stack disposed between the housing and the expander, and wherein the expander expands the anode exhaust, the expanded anode exhaust providing the purge gas to be fed back into the housing.

25. The system as defined in claim 21 wherein the second adsorbent is selected from the group consisting of: oxides or salts of copper impregnated or exchanged on activated carbon, alumina, and zeolites; oxides or salts of silver impregnated or exchanged on activated carbon, alumina, and zeolites; oxides or salts of tin impregnated or exchanged on activated carbon, alumina, and zeolites; and mixtures thereof.

26. The system defined in claim 21 further comprising a second adsorbent disposed in the housing for adsorbing carbon monoxide.

27. The system as defined in claim 26 wherein the desiccant material is selected from the group consisting of zeolite molecular sieves, activated alumina, silica gels, and mixtures thereof.

28. The system as defined in claim 26 further comprising a desiccant material disposed in the housing upstream of the second adsorbent.

29. The system as defined in claim 28 wherein the clay minerals are promoted with potassium carbonate and are adapted to reversibly adsorb carbon dioxide at temperatures between about 300° C. and about 500° C.

30. The system as defined in claim 21 wherein the adsorbent is selected from the group consisting of magnesium, calcium, manganese, lanthanum, magnesium oxide, calcium oxide, manganese oxides, lanthanum oxides, clay minerals, and mixtures thereof.

31. The system as defined in claim 21 wherein the catalyst is $Fe_3O_4/Cr_2O_3$.

32. The apparatus as defined in claim 21 wherein the weight ratio of adsorbent to catalyst is between about 1:20 and about 20:1.

33. The system as defined in claim 21 wherein the adsorbent is clay minerals selected from the group consisting of dolomites, sepiolites, hydrotalcites, and mixtures thereof.

34. The system consisting essentially of the apparatus of claim 21 operably disposed between a primary reactor and a fuel cell stack.

* * * * *

UNITED STATES PATENT AND TRADEMARK OFFICE
CERTIFICATE OF CORRECTION

PATENT NO. : 6,692,545 B2
DATED : February 17, 2004
INVENTOR(S) : Craig S. Gittleman and Ramesh Gupta It is certified that error appears in the above-identified patent and that said Letters Patent is hereby corrected as shown below:

Title page,
Item [73], please add the following additional Assignee, -- Exxonmobil Research and Engineering Company - Annandale, New Jersey --.

Signed and Sealed this

Thirty-first Day of August, 2004

JON W. DUDAS
*Director of the United States Patent and Trademark Office*